Patented Mar. 21, 1933

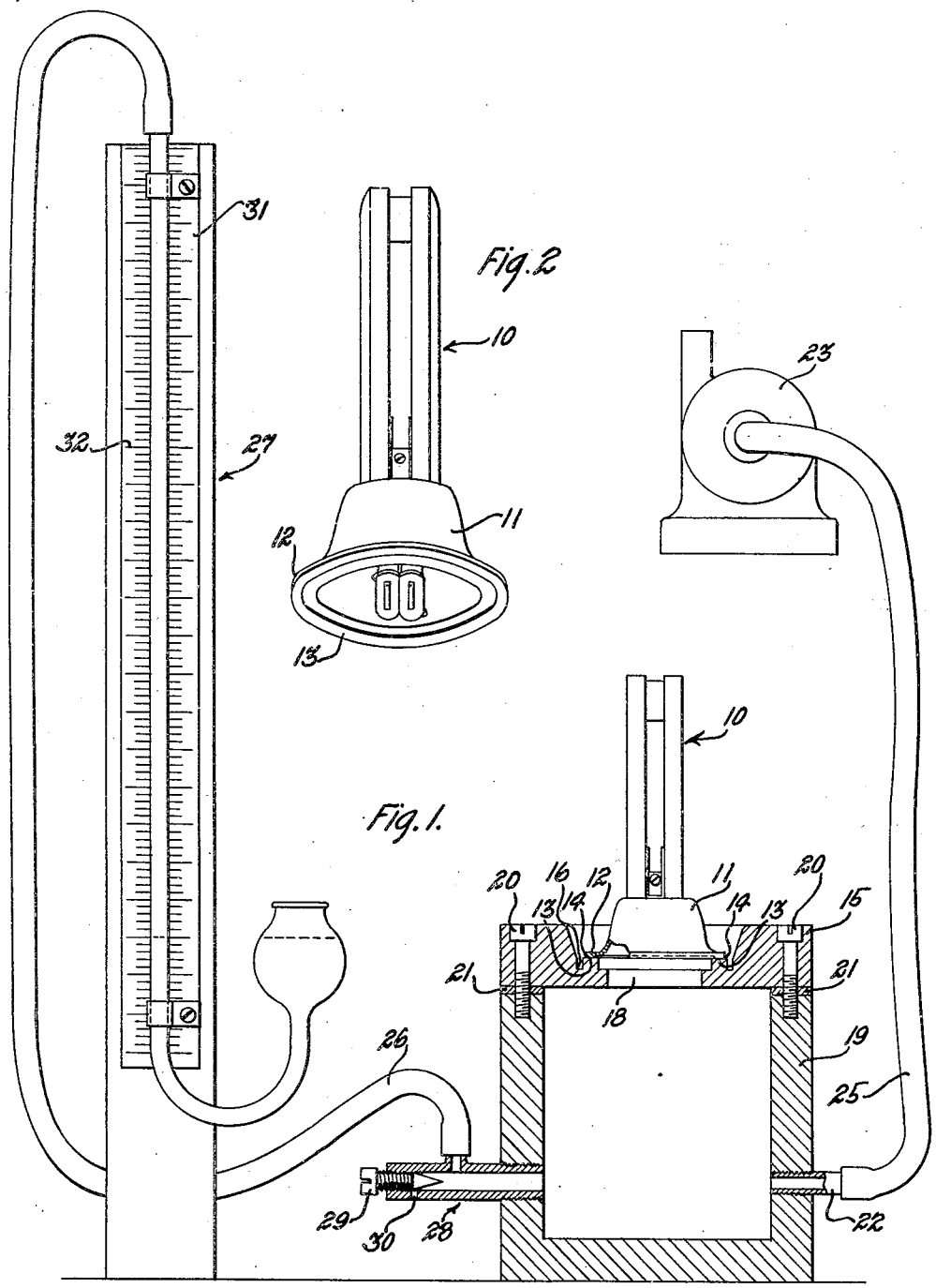

1,901,966

UNITED STATES PATENT OFFICE

RAGNAR ERIC HOFFMAN, OF ELMWOOD PARK, AND CHRISTIAN PAULSON, OF CHICAGO, ILLINOIS, ASSIGNORS TO WESTERN ELECTRIC COMPANY, INCORPORATED, OF NEW YORK, N. Y., A CORPORATION OF NEW YORK

APPARATUS FOR GAUGING MATERIAL

Application filed January 28, 1928. Serial No. 250,135.

This invention relates to an apparatus for gauging material, and more particularly to a pneumatic gauge for determining the surface characteristics of a material.

In the inspection of a material or part for unevenness or warping of a surface, considerable time is required in making the tests with the instruments commonly employed for this purpose. In the manufacture of telephone receivers, the seat for the diaphragm must be very carefully checked with a standard or master surface for any irregularities in the surface as the efficiency of the telephone receiver is dependent to a great extent upon the accurate seating of the diaphragm. The necessity for this high degree of precision in the large scale production of standard parts, which are required to be interchangeable, demands considerable skill and a vast expenditure of time in the accurate inspection of the parts.

The principal object of the invention is to provide an apparatus of simple and sensitively operable construction for quickly and accurately checking material with a standard.

One embodiment of the invention consists in mounting a standard or master surface upon a vacuum chamber which is connected to a manometer, whereby a part to be tested is seated on the standard and used as a seal to the inlet of the vacuum chamber so that the reading of the manometer will indicate the degree of fit or the amount of deviation of the part from the standard.

The features and advantages will be better understood from the following description taken in connection with the accompanying drawing disclosing one embodiment of the invention, and wherein Fig. 1 is an elevational view, partly in section, disclosing the diaphragm seat of a telephone receiver resting upon a standard surface associated with a vacuum chamber and a manometer, and Fig. 2 is a perspective view of the telephone receiver part having the diaphragm seat to be tested.

Referring now to the drawing, wherein the same reference characters denote similar parts in the different views, the numeral 10 designates a telephone receiver magnet assembly of an ordinary type carrying a cup 11 which has a laterally extending flange 12. This circular flange 12 has a flat ground surface 13 which serves as a seat for the receiver diaphragm and is the surface under test. The seat 13 is caused to rest on an annular master surface 14 of a solid of rectangular cross-section, which is integral with a member 15 and surrounds an opening 18. An annular groove 16 encircles the master surface 14 and assures a free circulation of air therearound and permits of a ready path for air to enter through a deviation in the surface under test into the chamber through the opening 18. The member 15 is clamped to a vacuum chamber 19 by screws 20, and the juncture is made air tight by interposing a gasket 21 between the underside of the member 15 and the upper edge of the chamber 19.

A flexible tube 25 is attached to a threaded pipe 22 which terminates on the inside of the chamber 19. The other end of the flexible tube 25 is connected to a suction pump 23 of any suitable type for evacuating the chamber 19 at a uniform rate, the pump being driven by any suitable means such as an electric motor (not shown). Another flexible tube 26 connects a manometer 27 with a by-pass valve 28 which extends into the inside of the chamber 19, and is provided with an adjustable screw 29 whereby the amount of opening to the atmosphere of an aperture 30 can be very closely adjusted. The opening of the aperture 30 is adjusted so that with a perfect seal between seat 13 and the master surface 14, mercury will not be withdrawn from the manometer 27 due to the maximum vacuum which can be created by the suction pump.

When a standard part is placed in position upon the master surface and the pump is withdrawing air from the chamber at a uniform rate, a slight amount of air is drawn in through the adjusted opening 30 in the valve 28 as the pressure within the chamber becomes less than atmospheric pressure; the air admitted through this opening increases as the evacuation progresses until an equilibrium is attained between the air being withdrawn and the air admitted when the vacuum within the chamber and the reading of the manometer remain constant. When an unsatisfactory part is under test there is an additional leakage of air between the gauged surface and master surface and, therefore, a lower vacuum will exist in the chamber when the equilibrium is reached and the manometer will have a lower reading. The manometer 27 is provided with a suitable scale 31 having a predetermined mark 32. When the mercury of the manometer extends above this mark the part under test is accepted as being satisfactory, and when it is below this mark the part under test is rejected as unsatisfactory. This minimum acceptable limit 32 on the scale is established with the use of standard telephone receivers having satisfactory diaphragm seats.

The operation of the above described apparatus is as follows: A telephone receiver magnet assembly 10, the diaphragm seat of which is to be inspected, is placed with the diaphragm seat 13 face downward on the annular master surface 14, which is supported on the vacuum chamber 19. The suction pump 23 connected to the vacuum chamber by means of the tube 25 is operating at a constant speed to give a uniform rate of evacuation within the chamber 19. If the surface characteristics of the seat 13 are satisfactory, the head of the mercury in the manometer will extend above the predetermined minimum mark 32; if the mercury column falls beneath the mark 32 on the scale 31 it indicates that there is an irregularity in the seating surface 13 of sufficient deviation to cause a rejection of that part. The apparatus is very sensitive and gives a quick test with no loss of accuracy.

It will be understood that the embodiment of the invention herein described and illustrated is merely a convenient and useful form of the invention, which is capable of many other modifications, and that the invention is not to be limited to the particular construction shown, except as defined by the appended claims.

What is claimed is:

1. In an apparatus for gauging the surface characteristics of a material, a chamber having an opening and a standard surface adapted to engage the surface under test and surrounding said opening, means for exerting an evacuating force at a uniform rate upon the air within the chamber, and means responsive to the degree of evacuation for indicating a variation between the surface under test and the standard surface.

2. In an apparatus for gauging the surface characteristics of a material, a chamber having an opening therein and a standard plane surface adjoining the opening for engaging the surface to be gauged, means for evacuating the air from the chamber at a predetermined rate, means for admitting air and preventing the vacuum in the chamber from exceeding a predetermined value, and means responsive to the degree of evacuation for indicating a variation between the surface under test and the standard surface.

3. In an apparatus for successively gauging the surface characteristics of similar parts, a member having an aperture therein and a master surface surrounding the aperture for engaging the parts, a chamber communicating with the aperture, means for withdrawing air from the chamber at a predetermined rate, means for admitting air into the chamber at a rate to equilibrate the withdrawal of the air and thereby obtain a constant vacuum, and means responsive to the vacuum for indicating the surface characteristics of the part to be gauged.

4. In an apparatus for gauging the surface characteristics of a material, a chamber having an opening therein and a master surface adjoining the opening for engaging the surface of the material under test, means for changing the air pressure within the chamber at a predetermined rate, and a manometer communicating with the chamber for determining the surface characteristics of the material being gauged.

5. In an apparatus for gauging the surface of a material, a chamber having an opening therein and a standard surface adjoining the opening for engaging the material to be gauged, means for changing the air pressure within the chamber at a predetermined rate, a valve for preventing the air pressure within the chamber passing a predetermined value, a scale, and a manometer associated therewith and in communication with the chamber for indicating on the scale a variation between the surface of the material under test and the standard surface.

6. In an apparatus for gauging material, a chamber having an opening therein, a rim surrounding the opening having a plane surface thereof adapted to engage a surface under test, means for exhausting air from the chamber at a uniform rate, and means for indicating the pressure of air in the chamber to thereby indicate the fit between the surface under test and the surface of the rim.

In witness whereof, we hereunto subscribe our names this 18 day of January A. D., 1928.

RAGNAR ERIC HOFFMAN.
CHRISTIAN PAULSON.